United States Patent [19]
Wilkinson et al.

[11] Patent Number: 5,618,367
[45] Date of Patent: Apr. 8, 1997

[54] DRY POWDER PROCESS FOR PREPARING UNI-TAPE PREPREG FROM POLYMER POWDER COATED FILAMENTARY TOWPREGS

[75] Inventors: Steven P. Wilkinson, Coopersburg, Pa.; Norman J. Johnston, Newport News; Joseph M. Marchello, Hampton, both of Va.

[73] Assignee: The United States of America as represented by the Administrator of the National Aeronautics and Space Administration, Washington, D.C.

[21] Appl. No.: 425,005

[22] Filed: Apr. 10, 1995

[51] Int. Cl.⁶ .......................... B32B 31/16; B32B 31/00
[52] U.S. Cl. .................. 156/181; 156/166; 156/180; 156/247; 156/289; 156/283; 427/185; 427/195; 427/346; 427/375; 427/384
[58] Field of Search .................. 156/180, 181, 156/166, 289, 247, 283; 118/57; 427/185, 195, 346, 375, 386, 384, 389.8, 389.9

[56] References Cited

U.S. PATENT DOCUMENTS

| | | | |
|---|---|---|---|
| 3,844,822 | 10/1974 | Boss et al. | 118/70 X |
| 4,541,884 | 9/1985 | Cogswell et al. | |
| 4,543,145 | 9/1985 | Schnell et al. | 156/238 X |
| 4,680,224 | 7/1987 | O'Connor | |
| 4,790,257 | 12/1988 | Schermutzki | 118/57 X |
| 4,997,503 | 3/1991 | Bohannan et al. | 156/195 |
| 5,057,338 | 10/1991 | Baucom et al. | |
| 5,198,281 | 3/1993 | Muzzy et al. | 156/180 X |
| 5,201,979 | 4/1993 | Koba et al. | 156/161 |

OTHER PUBLICATIONS

J. T. Hartness, "The characterization and development of materials for advanced textile composites", 24th International SAMPE Technical Conference, Oct. 20–22, 1992, pp. T776–T790.

*Primary Examiner*—Jeff H. Aftergut
*Attorney, Agent, or Firm*—George F. Helfrich

[57] ABSTRACT

A process for preparing uni-tape prepreg from polymer powder coated filamentary towpregs is provided. A plurality of polymer powder coated filamentary towpregs are provided. The towpregs are collimated so that each towpreg is parallel. A material is applied to each side of the towpreg to form a sandwich. The sandwich is heated to a temperature wherein the polymer flows and intimately contacts the filaments and pressure is repeatedly applied perpendicularly to the sandwich with a longitudinal oscillating action wherein the filaments move apart and the polymer wets the filaments forming a uni-tape prepreg. The uni-tape prepreg is subsequently cooled.

18 Claims, 1 Drawing Sheet

DRY POWDER PROCESS FOR PREPARING UNI-TAPE PREPREG FROM POLYMER POWDER COATED FILAMENTARY TOWPREGS

ORIGIN OF THE INVENTION

The invention described described herein was made jointly in the performance of work under NASA Grant Numbers NCC1-150 and NAG1-1067 with the College of William and Mary, Old Dominion University, and an employee of the United States Government. In accordance with 35 U.S.C. 202, the grantees elected not to retain title.

BACKGROUND OF THE INVENTION

1. Field of the Invention

The present invention relates to a process for preparing uni-tape prepreg. In particular it relates to a process for preparing uni-tape polymeric prepreg from powder coated filamentary towpregs.

2. Description of the Related Art

The thorough impregnation of carbon fibers with high temperature polyimides is a vital step in producing quality prepreg for the preparation of advanced composites. The quality of a composite part is directly related to the quality of the material precursor from which it was fabricated. A finished composite part that is void free and exhibits good mechanical properties is practically impossible to manufacture if the starting materials for its fabrication (i.e. prepregs) are of poor quality. Thus, the preparation of quality prepregs that meet the required specifications and have uniform fiber/polymer distributions is an essential part of the composite fabrication process.

One of the major problems associated with prepregging is achieving a balance between the structure-property relationships and processing characteristics. In fabricating composite parts, a prepreg's tack and drape characteristics are often considered.

Several processes have been developed in order to make good quality prepreg from high temperature polymers which may have differing tack and drape properties. One approach is to prepare polymer prepregs from monomeric reactants (PMR). The disadvantage to this approach is that it requires the use of monomeric diamines, many of which are toxic.

Solution prepregging is another method which is used for producing prepreg. In this method, the viscosity of the polymer is lowered by adding solvents. It is important that the polymer selected for this process has good solubility characteristics. The amount of tack and drape exhibited by prepregs prepared by this process is a function of the residual solvent remaining in the polymeric matrix and can be controlled depending on the drying capabilities of the process. Thus, residual solvents need to be removed during consolidation which is cause for numerous problems such as toxicity and void formation in the fabrication of large composite parts.

In yet another process, collimated fiber bundles are brought into contact with films of thermosetting monomers that have very low viscosities when heated. The impregnation of the fibers by these hot-melt monomers is achieved easily and good wet-out of the fibers by the resins is made. The low viscosity needed to impregnate fibers with thermoplastic polymers of high molecular weight can be achieved by a number of methods. As described in U.S. Pat. No. 4,541,884 to Cogswell et al., plasticizers may be used. In their process, filaments are drawn through a melt comprised of a polymer and a plasticizer. This process has its disadvantages whereby the plasticizer must be thermally stable at least up to the temperature of the melt and have volatility characteristics such that the plasticizer can be volatilized from the composition below the decomposition temperature of the composition. In addition, the plasticizer must have a sufficiently low volatility at the temperature of the melt to plasticize the polymer in the melt and to give a melt of reduced viscosity compared with the melt viscosity of the polymer alone. Thus, in order to assure optimum property retention, the plasticizer must be removed from the polymer prior to prepreg consolidation into a structural part.

O'Connor (U.S. Pat. No. 4,680,224) describes a pultrusion process for preparing thermoplastic prepregs. In this process, a polymer slurry comes in contact with fiber strands which are subsequently dried in an oven causing the polymer to adhere to the fibers. The fibers are then passed through a tapered die to attain a well consolidated thermoplastic prepreg. In order to aid in processing, wetting agents and anti-corrosion compounds are utilized which remain in the final product.

Attempts have been made to prepare prepregs which have no volatiles remaining inside the matrix resin. These prepregs exhibit no tack and little drape character. In order to process these materials, they must be heated above their glass transition temperatures during processing to provide the desirable tack and drape. One such method involves the passage of grounded reinforcing fibers over an electrostatically charged, fluidized bed of powdered thermoplastic resin. The powder is attracted to the fiber and the resin is flowed into place as the material passes through an inline oven. Muzzy et al. (U.S. Pat. No. 5,198,281) discloses a similar method for the production of a non-woven towpreg fabric. In their process, reinforcing filaments are spread, coated with the matrix forming material to cause interfacial adhesion, and the towpreg plies formed by heating the matrix forming material until the matrix forming material liquefies and coats the reinforcing filaments. The towpreg plies are then cooled in a manner so that the towpregs remain substantially unconsolidated until the matrix forming material solidifes. A plurality of the towpreg plies are overlapped and bonded to together to form multidimensional fabrics, preforms and composite articles. Baucom et al. (U.S. Pat. No. 5,057,338) describes a process for the uniform application of polymer powder particles to a filamentary material in a continuous manner to form a uniform composite prepreg material. A tow of the filamentary material is fed under carefully controlled tension into a spreading unit where it is spread pneumatically into an even band. The spread filamentary tow is then coated with polymer particles from a fluidized bed, after which the coated filamentary tow is fused before take-up on a package for subsequent utilization.

An object of the present invention is to provide a dry powder process for preparing uni-tape prepreg which does not require the use of additives to lower the polymer viscosity.

Another object of the invention is to provide a process for preparing uni-tape prepreg whereby the starting material is a plurality of polymer powder coated filamentary towpregs.

Another object of the invention is to provide a process for preparing uni-tape prepreg wherein a sandwich is prepared from the polymer powder coated filamentary towpregs and a material.

Another object of the invention is to provide a process for preparing uni-tape prepreg wherein pressure is repeatedly applied perpendicularly to the sandwich with a longitudinal oscillating action which allows the filaments to move apart and the polymer to wet them.

SUMMARY OF THE INVENTION

The objects of the invention were acheived by the following process. A dry powder process for preparing uni-tape prepreg from polymer powder coated filamentary towpregs comprises the steps of first providing a plurality of polymer powder coated filamentary towpregs. The polymer powder coated filamentary towpregs were collimated so that each polymer powder coated filamentary towpreg was parallel and each polymer powder coated filamentary towpreg has an upperside and an underside. A material was applied to the uppersides of the towpregs and the undersides of the towpregs to form a sandwich. The sandwich was heated to a temperature wherein the polymer flowed and intimately contacted the filaments. Pressure was repeatedly applied perpendicularly to the sandwich with a longitudinal oscillating action wherein the filaments moved apart and the polymer wetted the filaments forming a uni-tape prepreg. Lastly, the prepreg was cooled. The final product of this process results in a uni-tape prepreg which is coated with a material such as titanium foil.

As an alternative to this process, the material which is applied to the uppersides and undersides of the towpregs may be a release material. Examples of this release material include stainless steel foil, poly(tetrafluoroethylene) coated glass cloth, silazane coated steel and silazane coated glass cloth. When a release material is used to make the sandwich, removal is required after the uni-tape prepreg has been cooled.

IN THE DRAWINGS

FIG. 1 is a schematic showing the process of the present invention.

DESCRIPTION OF THE PREFERRED EMBODIMENTS

Figure 1:
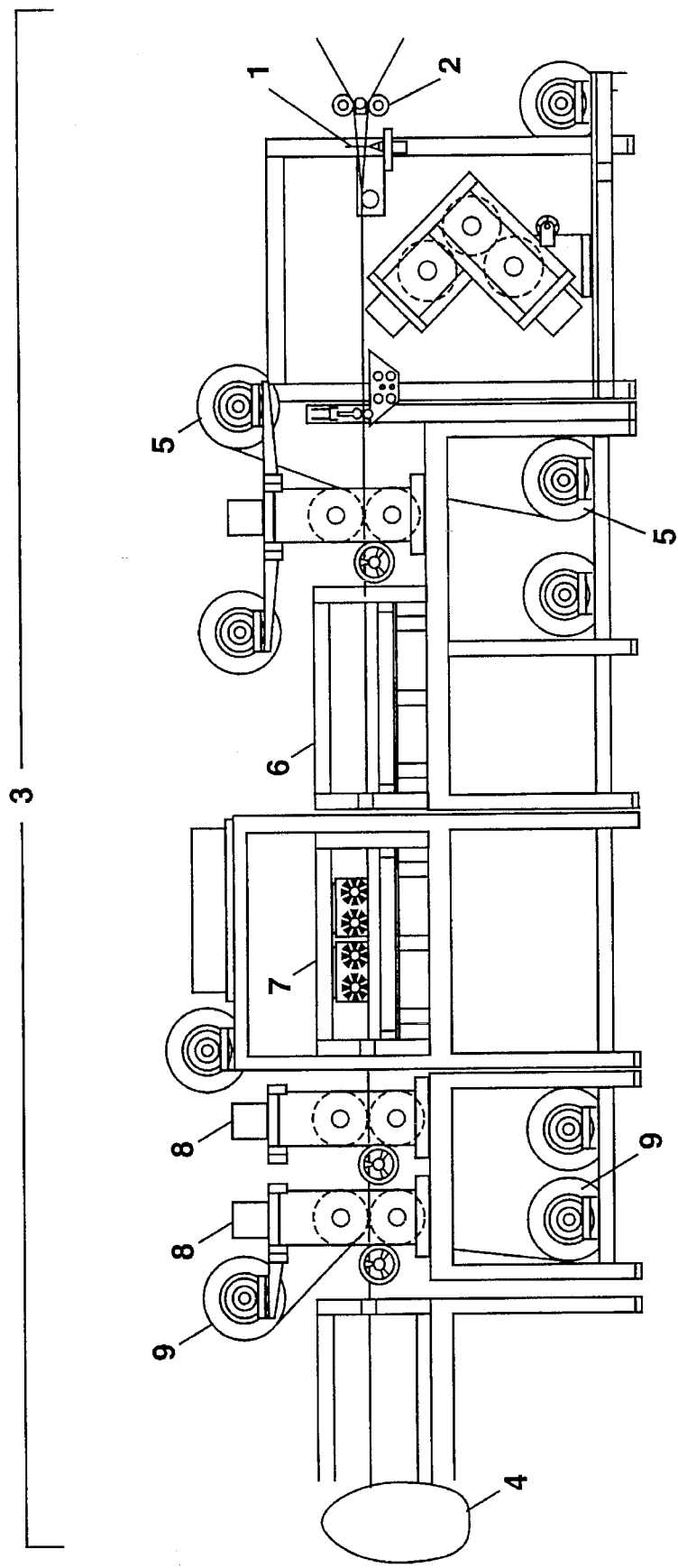

By the process of the present invention, uni-tape prepreg was prepared without requiring the use of additives or solvents to lower the polymer viscosity. This process is not only environmentally friendly but also offers a cost savings over the current state of the art processes.

Polymer powder coated filamentary towpregs such as those prepared by the processes of Baucom et al. (U.S. Pat. No. 5,057,338) or Muzzy et al. (U.S. Pat. No. 5,198,281) or any other process known to those skilled in the art were provided. The polymer which is used to coat these filamentary towpregs may be either a thermoplastic or a thermosetting polymer. Preferred polymers include a polyimide, an epoxy, a bismaleimide, a polyester, a poly(benzimidazole), a poly(arylene ether) and a polyamide. A polyimide is the most preferred polymer for the present invention.

Various fibers are considered to be suitable for the tow fibers or filaments. These fibers may be either sized or unsized depending on the polymer used in order to enhance the bonding between the fiber and the polymer. In particular, these fibers may be selected from the group consisting of: carbon fiber, glass fiber such as fiberglass®, organic fiber such as a polyamide (known as Kevlar®) and boron fiber. As a most preferred embodiment, carbon fibers and polyamide fibers were found to be suitable for the present invention.

Referring now to FIG. 1, a plurality of polymer powder coated filamentary towpregs were arranged on a number of spools at a fiber creel. The polymer powder coated filamentary towpregs (1) were collimated at a comb (2) so that each polymer powder coated filamentary towpreg was parallel and each towpreg has an upperside and an underside. The tows were passed through a tape machine (3) to pull rollers (4) which were motor driven and control the speed of the coated tows through the process.

A material (5) was applied to the uppersides of the towpregs and undersides of the towpregs to form a sandwich of the material and the collimated polymer powder coated filamentary towpregs. The material which is applied may be either a permanent material such as titanium foil or a release material. The advantage to selecting titanium foil as the material for the sandwich is that the titanium foil enhances the overall performance of the uni-tape prepreg. As an alternative embodiment, several different release materials have been found to be suitable for the present invention. Although any release material known to those skilled in the art may be used, as a preferred embodiment release materials selected from the group consisting of: stainless steel foil, poly(tetrafluoroethylene) coated glass cloth, silazane coated steel and silazane coated glass cloth proved to be suitable for the present invention. Silazane coated glass cloth gave the best results in terms of processing and removal from the uni-tape prepreg.

The sandwich of material enters a hot-plate (6) which heats the sandwich to a temperature wherein the polymer flows and intimately contacts the filaments. The heated sandwich was pulled through to a second hot plate which contains a hot-sled attachment (7). The hot-sled was lowered onto the surface of the sandwiched material and pressure was repeatedly applied perpendicularly to the sandwich with a longitudinal oscillating action wherein the filaments moved apart and the polymer flowed and intimately contacted the filaments forming a uni-tape prepreg. Although a hot-sled is preferred for the repeated application of pressure perpendicularly to the sandwich any other apparatus which can apply a longitudinal oscillating action to the sandwich may be used. The hot-sled is preferred because of its capability to be heated to temperatures above 800° F. As an alternative, hot nip-rollers which may be heated to temperatures above 800° F. may also be used to apply pressure however, the lack of oscillating action results in a less consolidated tape than that of the present invention. It is the combination of the high temperature and intermittent pressure provided through the longitudinal oscillatory action that permits fusion of the polymeric powder together. The amount of fusion can be controlled by changing the temperature and pressure. This controls the drape characteristic of the resulting tape product.

The uni-tape prepreg exits the hot ovens and is nipped at cold rollers (8) to cool the product and help remove any protecting release material (9) which may have been applied. The uni-tape prepreg is used to prepare composites.

THEORETICAL CONSIDERATIONS

The key to the dry powder process is found in the application of an oscillating action to the sandwich. The oscillating action provided by the hot sled or any other apparatus known to those skilled in the art enables pressure to be exerted repeatedly on the polymer powder coated towpreg sandwich as the material passes over the hot-plate and experiences temperatures that enable the polymer to flow. For completely imidized polyimides these temperatures can approach or exceed 400° C.

A point of contact on the prepreg (or a line drawn across its width) experiences a number of roller contacts during the process. Each contact point applies a certain amount of pressure to the towpreg sandwich for consolidation. The pressures applied to the towpreg sandwich and the number of times these pressures are experienced are dictated by various operation and design parameters. The hot sled action and towpreg motion are described mathematically as follows.

Each roller on the sled moves back and forth over the surface according to Equation 1. Here $X_R$ is the roller's location along the oven surface. The amplitude of the roller's motion over the oven surface is denoted as A. This is equal to half the roller's traverse distance. Roller frequency is denoted as $\omega$ and t is time.

$$X_R = A \sin\omega t \qquad \text{Equation 1}$$

If the towpreg moves over the hotplate surface at a velocity $U_t$ then Equation 2 represents the location of the contact point of the tape.

$$X_t = U_t t \qquad \text{Equation 2}$$

The roller and point on the tape will make contact when $X_t = X_R$. This results in Equation 3 which is a transendental equation and must be solved numerically or graphically.

$$A \sin\omega t = U_t t \qquad \text{Equation 3}$$

The solutions will be at values of t corresponding to the intersection of the line and sine function.

Calculating the number of contact points is the first step in analyzing the pressure experienced by the polymer powder coated towpreg during its consolidation. As the hot-sled passes back and forth over the sandwich and the pressure rises and falls, the action of the pressure rollers is to repeatedly force the fiber and resin together. This causes fiber movement, resin wetting, flow and void elimination. All of these are required for complete consolidation.

EXAMPLES

Example 1

Twenty-one spools of LaRC™-IA (4% offset polyimide, commercially available from Imitec, Inc.) was powder prepregged onto 12K AS4 carbon fiber (commercially available from Hercules) following the process of Baucom et al. (U.S. Pat. No. 5,057,338) incorporated by reference herein. Each spool contained 121.9 meters (400 feet) of towpreg with a powder resin content of 37% by weight. The towpreg spools were loaded on the creel and set, using a comb as a guide for collimating the towpregs so that each is parallel and each has an upperside and an underside. The comb was set to produce a 6.35 cm (2.5 inch) wide tape.

Teflon™ coated glass cloth was applied to the uppersides and undersides of the towpregs to sandwich the collimated towpreg. The hot plate was set at 302° C. and served to preheat the towpreg before it passed between the hot-plates and the sled rollers. The second hot-plate was set at 371° C. and the tape line speed was 1.1 ft/min. Pressure was applied repeatedly at a perpendicular point to the sandwich by the hot-sled. The hot-sled caused the filaments to move apart and the polymer to come into intimate contact with the filaments. After cooling, the Teflon™ coated glass cloth was removed. Over 200 feet of well consolidated tape was prepared. The uni-tape prepreg exhibited good tow-to-tow adhesion and no splits were present. The average thickness of the tape was 0.04318 cm which suggested that it contained approximately 20% voids of trapped air.

Composites were prepared from the uni-tape prepreg and tested. The 0° flexure results at room temperature were found to be dependent on the consolidation pressure. For a consolidation pressure of 250 psi, the flexure was 1338 MPa. At 500 psi, the flexure was 1744 MPa. Acid digestion studies showed that the void content was less than 1%. Table 1 summarizes the mechanical properties of these composites.

TABLE 1

| Consolidation Pressure (psi) | Test Temperature (°C.) | 0° Flex Strength MPa (ksi) | 0° Flex Modulus GPa (msi) |
|---|---|---|---|
| 250 | 23 | 1338 ± 165 (194 ± 24) | 101 ± 3 (14.7 ± 0.4) |
| 250 | 177 | 910 ± 90 (132 ± 13) | 97 ± 4 (14.1 ± 0.6) |
| 350 | 23 | 1510 ± 103 (219 ± 15) | 102 ± 2 (14.8 ± 0.3) |
| 350 | 177 | 1048 ± 35 (152 ± 5) | 109 ± 1 (15.9 ± 0.1) |
| 500 | 23 | 1744 ± 55 (253 ± 8) | 108 ± 6 (15.6 ± 0.8) |
| 500 | 177 | 896 ± 34 (130 ± 5) | 92 ± 3 (13.4 ± 0.4) |

Example 2

New TPI (Aurum 500 grade polyimide powder, commercially available from Mitsui Toatsu) was powder coated onto IM-8 fibers (commercially available from Hercules), following the technique of J. T. Hartness et al. (International SAMPE Technical Conference, 24, 129 (1992)) incorporated by reference herein. The powder content was 38% by weight. Thirty spools of the powder coated material were collimated at the comb and passed through the machine. Teflon™ coated glass cloth was used as the release material and was applied to the uppersides and the undersides of the towpregs to form a sandwich around the towpreg. The first hot plate was heated to 371° C. and the second to 410° C. The line speed was set to 1 ft/min. and the sled oscillation frequency was maintained at 6 cycles/min. Tow tensions were set at 350 grams to ensure that no fiber buckling occured. After cooling, the Teflon™ coated glass cloth was removed. Approximately 91 meters of unitape prepreg was prepared.

Composites were prepared from the uni-tape prepreg. The properties of these composites are comparable to those prepared from solution prepregging methods. For 0° flex and short beam shear tests, property retentions at 177° C. were 64% and 62% respectively. The room temperature 0° flexure result was 1613 Mpa. The short beam shear result was 72 Mpa. Table 2 summarizes the mechanical properties of the composite.

TABLE 2

| Composite Property | Test Temperature °C. | Strength MPa (ksi) |
|---|---|---|
| Short beam shear | 23 | 71.7 ± 2.1 (10.40 ± 0.3) |
| Short beam shear | 93 | 66.2 ± 6.9 (9.6 ± 1.0) |

TABLE 2-continued

| Composite Property | Test Temperature °C. | Strength MPa (ksi) |
|---|---|---|
| Short beam shear | 150 | 60.7 ± 6.9 (8.8 ± 1.0) |
| Short beam shear | 177 | 45.5 ± 12.4 (6.6 ± 1.8) |
| 0° Flexure | 23 | 1613 ± 35 (234 ± 5) |
| 0° Flexure | 177 | 1048 ± 21 (152 ± 3) |

The foregoing specific examples are exemplary and are not to be considered as exhaustive, but merely to illustrate the invention without serving as limitations thereon.

What is claimed is:

1. A dry powder process for preparing uni-tape prepreg from polymer powder coated filamentary towpregs, the process comprising the steps of:
   (a) providing a plurality of polymer powder coated filamentary towpregs;
   (b) collimating the polymer powder coated filamentary towpregs so that each polymer powder coated filamentary towpreg is parallel and each polymer powder coated filamentary towpreg has an upperside and an underside;
   (c) applying a material to the uppersides of the polymer powder coated filamentary towpregs and the undersides of the polymer powder coated filamentary towpregs to form a sandwich;
   (d) heating the sandwich to a temperature wherein the polymer flows and intimately contacts the filaments;
   (e) applying pressure repeatedly perpendicularly to the sandwich with a longitudinal oscillating action wherein the filaments move apart and the polymer wets the filaments forming a uni-tape prepreg; and
   (f) cooling the uni-tape prepreg.

2. A dry powder process for preparing uni-tape prepreg from polymer powder coated filamentary towpregs according to claim 1, wherein the polymer is selected from the group consisting of: a polyimide, an epoxy, a bismaleimide, a polyester, a poly(benzimidazole), a poly(arylene ether) and a polyamide.

3. A dry powder process for preparing uni-tape prepreg from polymer powder coated filamentary towpregs according to claim 2, wherein the polymer is a polyimide.

4. A dry powder process for preparing uni-tape prepreg from polymer powder coated filamentary towpregs according to claim 1, wherein the polymer powder coated filamentary towpregs are prepared from a member selected from the group consisting of: carbon fiber, glass fiber, organic fiber and boron fiber.

5. A dry powder process for preparing uni-tape prepreg from polymer powder coated filamentary towpregs according to claim 4, wherein the polymer powder coated filamentary towpregs are prepared from carbon fiber.

6. A dry powder process for preparing uni-tape prepreg from polymer powder coated filamentary towpregs according to claim 4, wherein the organic fiber is a polyamide.

7. A dry powder process for preparing uni-tape prepreg from polymer powder coated filamentary towpregs according to claim 1, wherein the material is titanium foil.

8. A dry powder process for preparing uni-tape prepreg from polymer powder coated filamentary towpregs according to claim 1, wherein the polymer is a polyimide, the polymer powder coated filamentary towpregs are prepared from carbon fiber and the material is titanium foil.

9. A dry powder process for preparing uni-tape prepreg from polymer powder coated filamentary towpregs according to claim 1, wherein the material is a release material.

10. A dry powder process for preparing uni-tape prepreg from polymer powder coated filamentary towpregs according to claim 9, further comprising the step of removing the release material from the uni-tape prepreg of step (f) of claim 1.

11. A dry powder process for preparing uni-tape prepreg from polymer powder coated filamentary towpregs according to claim 10, wherein the polymer is selected from the group consisting of: a polyimide, an epoxy, a bismaleimide, a polyester, a poly(benzimidazole), a poly(arylene ether) and a polyamide.

12. A dry powder process for preparing uni-tape prepreg from polymer powder coated filamentary towpregs according to claim 11, wherein the polymer is a polyimide.

13. A dry powder process for preparing uni-tape prepreg from polymer powder coated filamentary towpregs according to claim 10, wherein the polymer powder coated filamentary towpregs are prepared from a member selected from the group consisting of: carbon fiber, glass fiber, organic fiber and boron fiber.

14. A dry powder process for preparing uni-tape prepreg from polymer powder coated filamentary towpregs according to claim 13, wherein the polymer powder coated filamentary towpregs are prepared from carbon fiber.

15. A dry powder process for preparing uni-tape prepreg from polymer powder coated filamentary towpregs according to claim 13, wherein the organic fiber is a polyamide.

16. A dry powder process for preparing uni-tape prepreg from polymer powder coated filamentary towpregs according to claim 10, wherein the release material is selected from the group consisting of: stainless steel foil, poly(tetrafluoroethylene) coated glass cloth, silazane coated steel and silazane coated glass cloth.

17. A dry powder process for preparing uni-tape prepreg from polymer powder coated filamentary towpregs according to claim 16, wherein the release material is silazane coated glass cloth.

18. A dry powder process for preparing uni-tape prepreg from polymer powder coated filamentary towpregs according to claim 10, wherein the polymer is a polyimide, the polymer powder coated filamentary towpregs are prepared from carbon fiber and the release material is silazane coated glass cloth.

* * * * *